Patented July 15, 1947

2,424,074

UNITED STATES PATENT OFFICE 2,424,074

TALL OIL ESTER RESINS AND THEIR PRODUCTION

Franklin A. Bent and Elbert A. Peterson, Berkeley, Calif., assignors to Shell Development Company, San Francisco, Calif., a corporation of Delaware No Drawing. Application October 28, 1943,
Serial No. 508,060

11 Claims. (Cl. 260—23)

This invention relates to resins and more particularly to the production of resins by reacting selected polyhydric alcohols with tall oil and the like.

In paper manufacture pine wood is cut into chips, which are treated with steam, caustic soda, sodium sulfite and other chemicals under pressure. The cooked chips are freed from the liquid portion, called black liquor, of the resulting mixture, washed, and converted into paper. The black liquor is subjected to evaporation, in which the liquor becomes more and more concentrated. Certain soaps present separate and are removed by skimming. When the soaps are acidified, the acids present are set free. The product is crude tall oil. Other terms sometimes used synonymously with tall oil are lignin liquor, talloel, tallol and liquid rosin.

Crude tall oil can be refined by many methods. One method used consists in first distilling the material under reduced pressure. The residue is tall oil pitch. The distillate is then treated with clay or similar material to remove crystallization inhibitors. It is then chilled, whereupon abietic acid crystals separate out and are removed. The remaining liquid is refined tall oil, which can be further purified by solvent extraction, e. g. with furfural or propane, to remove residual abietic acid.

The composition of tall oil varies with the source of wood, the process of digestion and the method and extent of purification. The principal constituents are rosin acids, fatty acids and unsaponifiable material consisting in part of sterols and higher alcohols. Analyses of various tall oils show that the content of rosin acids may vary from about 12% to about 64%, fatty acids from about 30% to about 83%, and unsaponifiable material from about 5% to about 17%. Two currently available grades of tall oil are sold under the trade names "Ligro" and "Indusoil." The compositions, as reported by the manufacturer, are as follows:

|  | "Ligro" | "Indusoil" |
|---|---|---|
| Fatty acids_____per cent__ | 45–50 | 55–60 |
| Rosin acids (calc. as abietic)_____do____ | 42–48 | 34–38 |
| Sterols, higher alcohols, etc_____do____ | 6–9 | 6–10 |

Abietic acid is one of the rosin acids contained in "Ligro." "Indusoil" is substantially free from abietic acid. The rosin acids contained therein are liquid at room temperature. They do not esterify with methyl or ethyl alcohol on boiling for several minutes in the presence of sulfuric acid.

Tall oil has been used in the production of paints, lacquers and varnishes. Treatment with lime at an elevated temperature gives gloss oils, which are desirably modified with drying oils. It has been reported that a film-forming substance is produced by the condensation of phthalic anhydride with tall oil. Alkyd resins have been modified by the addition of tall oil before or after condensation. The glycerol and pentaerythritol esters of tall oil are resin-forming substances useful in coating compositions of many kinds.

The tall oil products so far developed have not found extensive use in the coating industry because of numerous deficiencies. One of the serious deficiencies is relative slowness of drying. The development of tall oil lacquers has not kept pace with the demand for quick-drying compositions. Another disadvantage is lack of compatibility with a sufficiently wide range of other film-forming materials. In many cases, brittleness, inferior adhesiveness, poor scratch resistance and vulnerability to physical and chemical attack have prevented commercialization of suggested compositions. Nevertheless, since tall oil is cheap and available in large quantities as a by-product of the sulfite pulp industry, the possibility of producing successful resins from tall oil has for many years been a continuous, intriguing spur to research.

It is an object of the present invention to produce valuable resins from tall oil. Another object is to provide for the synthesis from tall oil of resins having desirable film-forming properties. Another object is the production of new coating compositions. Another object is to provide baking enamels and the like having a combination of properties which is not resident in any other tall oil compositions, so far as we are aware. Other objects will be apparent from the description of the invention given hereinafter.

These objects are accomplished in accordance with the invention by the esterification of tall oil with polyhydric alcohols of aliphatic character having in the molecule hydroxyl groups which are separated from one another by at least four intervening atoms, or with derivatives of such polyhydric alcohols, and by the use of the resulting esters in the production of coatings and the like.

Preferred polyhydric alcohols are those in which the atoms separating the hydroxyl groups are carbon or ethereal oxygen atoms. The preferred alcohols contain at least two, preferably three or more, hydroxyl groups so separated. The alcohols can be produced by known methods of synthesis. Many of the alcohols are most easily produced by the polymerization of allyl-type alcohols. Because of the ease of preparation, low cost and availability, polymers of allyl-type alcohols constitute a preferred sub-group.

Allyl-type alcohols are unsaturated alcohols having an olefinic double bond of aliphatic character between two carbon atoms, one of which is directly joined to a saturated carbinol carbon atom. They have a structure which may be represented by the general structural formula

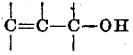

Preferred allyl-type alcohols have a terminal methylene group attached by an olefinic double bond to a carbon atom which is directly attached to a saturated carbinol carbon atom, as represented by the formula

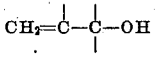

Allyl-type alcohols useful in the present invention preferably have not more than about eighteen carbon atoms and have at least one unsaturated carbon-to-carbon linkage for each six carbon atoms.

Representative examples of preferred allyl-type alcohols are the following: allyl alcohol, methallyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc.

Allyl-type alcohols can be polymerized by heating in the presence of oxygen or an oxygen-yielding polymerization catalyst, such as benzoyl peroxide, hydrogen peroxide, barium peroxide, etc. The product is a mixture of oxy-condensation polymers of the allyl-type alcohol, in which the monomer units are joined principally by carbon-to-carbon linkages, but a minor proportion of the units are joined by ethereal oxygen atoms. The majority of functional groups in the polymer are hydroxy groups, although there are also present units from allyl-type esters of unsaturated acids, unsaturated acids and/or unsaturated aldehydes. For example, with allyl alcohol there may be units from allyl acrylate, acrylic acid, and/or acrolein. The oxy-condensation polymerization of allyl-type alcohols is described and claimed in the co-pending application of Dannenberg and Adelson, Serial Number 420,388, filed November 25, 1941.

Polymers of allyl-type alcohols can be formed from polymers of derivatives of allyl-type alcohols. Preferred derivatives are halides and esters.

Allyl-type halides can be polymerized by any of a plurality of methods, such as exposure to actinic light, or treatment with boron tri-fluoride at a low temperature under anhydrous conditions, as disclosed in the co-pending application of Adelson and Dannenberg, Serial Number 417,140, filed October 30, 1941. The polymers consist of monomer units joined principally by carbon-to-carbon linkages. Polymers of allyl-type halides can be hydrolyzed by known or special methods to the corresponding polymeric allyl-type alcohols.

Allyl-type esters are convenient starting materials in the preparation of polymers of allyl-type alcohols. Suitable allyl-type esters are those of carboxylic acids devoid of a polymerizable unsaturated group, i. e. saturated aliphatic, including alicyclic, aromatic, etc., carboxylic acids. Representative examples of suitable allyl-type esters are allyl formate, allyl acetate, allyl propionate, allyl butyrate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl acetate, allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxyisobutyrate, allyl acetylglycolate, allyl stearate, allyl levulinate, beta-methylallyl butyrate, alpha-methylallyl acetate, alpha-phenylallyl acetate, allyl ethoxyformate, beta-methylallyl phenoxyformate, allyl naphthoate, allyl esters of hydrogenated abietic acid, diallyl malonate, diallyl succinate, diallyl adipate, diallyl maleate, diallyl phthalate, and the like.

Others are allyl-type esters of ethereal oxygen-containing carboxylic acids, such as diallyl diglycolate, diallyl dilactate, diallyl dihydracrylate, dimethallyl diglycolate, dicrotyl dilactate, dipropargyl diglycolate, etc. Another group consists of the allyl-type esters of inorganic acids, notably of the ortho acids of boron and silicon.

Allyl-type esters can be polymerized by heating in the presence of a polymerization catalyst, such as oxygen or an oxygen-yielding catalyst, as disclosed in the co-pending application of Adelson and Dannenberg, Serial Number 417,278, filed October 31, 1941. A number of types of inorganic salts act as polymerization catalysts. The esters can be polymerized also with heat in the absence of added catalyst. The polymers consist of monomer units joined principally by carbon-to-carbon linkages. The alcohols can be formed by hydrolysis or alcoholysis of the ester polymers, the latter preferably in the presence of a basic metal alcoholate, as described and claimed in the co-pending application of Adelson and Evans, Serial Number 425,118, filed December 31, 1941.

The radicals of both the oxy-condensation polymers of allyl-type alcohols and the polymers consisting of monomer units joined solely by carbon-to-carbon linkages are operable as components of the compounds of the invention. There are obvious methods, in addition to those already mentioned, of forming the polymeric allyl-type alcohols, and other alcohols which, while not polymeric allyl-type alcohols, are operable because they contain in the molecule three or more hydroxyl groups separated from one another by at least four, preferably five, carbon atoms.

Preferred alcohols are polymers of monohydric allyl-type alcohols of not over eighteen carbon atoms in the molecule, which polymers consist of from three to about ten monomer units and have a corresponding number of hydroxyl radicals. Instead of the raw polymers of the allyl-type alcohols, which usually contain residual unsaturation, there may be used air-blown or hydrogenated polymers, or polymers treated with sulfur dioxide or the like. This applies also to polymers of derivatives of allyl-type alcohols.

The present invention is concerned with the production of esters of tall oil with the aforementioned polyhydric alcohols, and particularly, with the aforementioned polymers of allyl-type alcohols.

One method of forming the compounds is the direct esterification of the alcohol with acid. This can be brought about by heating a mixture of the reactants, preferably with the continuous removal of water. The presence of an inert homogenizing liquid, such as a substance in which both reactants are soluble, shortens the reaction time. The liquid can be selected also with regard to its boiling point, so as to form a suitable azeotrope with water, making possible the continuous removal of water by azeotropic distillation. Suggested homogenizing liquids are kerosene, high boiling ethers, high boiling naphthas and high boiling coal tar solvents. Acids have a catalytic effect on the esterification.

Another method of forming the esters is acid exchange between a polymer of an allyl-type ester and tall oil. Conveniently the acid radical of the starting ester corresponds to an acid having a boiling point under the conditions of the reaction lower than that of any other products or reactants, thus permitting continuous removal of the acid product by continuous distillation. However, this provision is by no means essential. Suggested starting esters are compounds of polymers of allyl-type alcohols with lower fatty acids, e. g. formic, acetic, propionic, butyric, etc., acids, dicarboxylic acids, e. g. oxalic, malonic, succinic, phthalic, etc., acids, and inorganic acids, e. g. orthosilicic, orthoboric, phosphoric, etc., acids.

Other methods of preparation can be used. One convenient method consists in the simultaneous polymerization of an allyl-type compound and reaction with tall oil. For example, when a mixture of tall oil and an allyl ester, e. g. diallyl phthalate or allyl acetate, is heated, the allyl ester polymerizes and apparently at the same time becomes esterified with tall oil.

While the esterification ordinarily proceeds at temperatures as low as about 100° C., higher temperatures are more effective. Temperatures between about 250° C. and about 300° C. have been found satisfactory. The upper limit of temperature is dependent mainly upon the tendency of the reactants and products to decompose or become degraded.

To minimize undesired side reactions and to prevent excessive discoloration, it is sometimes desirable to conduct the reaction in the absence of oxygen-containing gases, preferably providing a blanket of an inert gas, such as nitrogen or carbon dioxide.

Polymeric allyl-type alcohols can be esterified with tall oil singly or in admixture with one another. Likewise, where monomeric allyl-type compounds are heated with tall oil, as described hereinabove, single compounds of mixtures of compounds can be used. A modification consists in producing resinous substances from mixtures of tall oil with one or more polymeric allyl-type compounds and one or more monomeric allyl-type compounds.

Instead of tall oil there may be used substantially any mixture of rosin acids and fatty acids in approximately the proportions in which they occur in tall oil. A large proportion, e. g. 75% or more, of the fatty acids should be unsaturated. Preferred unsaturated fatty acids contain in the molecule 18 carbon atoms. Linoleic is typical.

The compounds of the invention are, thus, principally esters of tall oil with polymeric allyl-type alcohols. Each molecule is presumed to contain both rosin acid ester groups and fatty acid ester groups.

Depending upon the nature of the components of the esters, upon the degree of esterification, etc., the esters may be liquid-to-resinous in character. While substantially colorless when pure, they may have a color ranging from pale straw to dark brown as produced under normal conditions of operation. Purification and decolorization can be effected by the usual methods.

The viscosity of the reaction products of tall oil with allyl-type compounds can be increased by heating in the presence or absence of oxygen. The process appears to be analogous to the bodying of drying oils. Temperatures of 100° F. to 500° F. are usual. Bodying is hastened by blowing with an oxygen-containing gas, such as air. It is promoted also by driers, such as red lead, litharge, manganese oxide, and preferably, the more readily soluble cobalt, lead, manganese, etc., resinates, linoleates and naphthenates. From about 0.01% to about 1.0% of drier by weight of reaction products is satisfactory. The addition of lime at elevated temperatures is somewhat effective. Bodying and subsequent drying are promoted by oxygen-containing compounds, such as ozone, inorganic peroxides and organic peroxides.

Bodying and drying of the compounds of the invention are presumed to be accompanied by, and dependent upon, cross-linking involving the unsaturated fatty acid radicals and/or the rosin acid radicals and/or the allyl-type radicals (which ordinarily retain in polymerization some of the unsaturation present in the monomers), and finally resulting in a three-dimensional molecular structure, which is substntially infusible and is resistant to the physical and chemical action of many common solvents. Cross-linking can occur by polymerization of the radicals, in which the double-bonded carbon atoms of the radicals become directly linked to similar carbon atoms of other radicals with a corresponding reduction in unsaturation. Cross-linking can also be effected by so-called element conversion, in which the double-bonded carbon atoms of the unsaturated radicals become linked to similar carbon atoms of other unsaturated radicals through one or more atoms of oxygen, sulfur, or the like, with a corresponding reduction in unsaturation. It is probable that in bodying and drying both kinds of cross-linking occur.

Bodied and unbodied compounds of the invention can be used in the preparation of paints, enamels, and lacquers. They may sometimes be used alone, except that one or more driers should usually be present. Fused driers, such as metallic resinates, linoleates and naphthenates, are preferred, although many other driers are effective. Litharge, lead acetate, lead carbonate, manganese dioxide, manganese borate and the corresponding calcium and zinc compounds can be used. More often, the coating compositions contain in addition one or more other film-formers, solvents, plasticizers, dyes, pigments and fillers. These and other modifying substances can be incorporated by any of the methods well known in the art.

Examples of other substances which can often be used to advantage in conjunction with the compounds of the invention are other synthetic drying oils, natural drying oils, gilsonite, rosin, colophony, shellac, copal, dammar gum, pitch, asphalt, protein plastics, cellulose derivatives, and synthetic plastics. Among the latter are phenol-aldehyde, urea-aldehyde, alkyd, super-polyamide and superpolyester-amide resins. Another group consists of polymers of compounds containing in the molecule a single polymerizable unsaturated carbon-to-carbon linkage, such as unsaturated esters of saturated monobasic acids, e. g. vinyl, allyl and methallyl esters of acetic, propionic, butyric, etc., acids; saturated esters of unsaturated monobasic acids, such as methyl, ethyl, propyl, etc., esters of acrylic and methacrylic acids; styrene; alpha-methyl styrene; ethylene; vinyl halides; vinylidene halides, allyl alcohol, allyl halides, etc. Related plastics are formed by a chemical after-treatment of one or more polymers. Typical examples of these are polyvinyl acetals, after-chlorinated polyvinyl-chloride, etc. Another group consists of polymers and chemically modified polymers of compounds having two or more polymerizable unsaturated carbon-to-carbon linkages unconjugated with respect to one another. Examples are the unsaturated polyesters of saturated polycarboxylic acids such as vinyl, allyl and methallyl esters of oxalic, malonic, succinic, glutaric, citric, tartaric, phthalic, isophthalic and naphthalene dicarboxylic acids; unsaturated polyesters of polybasic inorganic acids such as vinyl, allyl, methallyl, cyclohexenyl esters of the ortho acids of silicon and boron and the corresponding esters of sulfuric and phosphoric acids; unsaturated carboxylic acid polyesters of unsaturated polyhydric alcohols such as acrylic and methacrylic polyesters of glycol, diethylene glycol, triethylene glycol, trimethylene glycol, glycerol, etc.; unsaturated polyethers of polyhydric alcohols such as vinyl, allyl and methallyl polyethers of glycol, diethylene glycol, triethylene glycol, trimethylene glycol, glycerol, etc.; ethers having two or more unsaturated aliphatic radicals such as vinyl, allyl, methallyl and crotyl diethers; unsaturated esters of unsaturated acids such as vinyl, allyl and methallyl esters of acrylic and methacrylic acids. Other modifiers are substances formed by the polymerization and copolymerization of compounds having two or more conjugated polymerizable unsaturated linkages, such as butadiene, the pentadienes, the hexadienes, etc., monovinyl acetylene and divinyl acetylene.

The compounds and compositions with which the invention is concerned can be used for many purposes. They can be used for sizing and impregnating fibrous material, such as woven cloth, felt and paper. Others can be so formulated that they are suitable as adhesives and interlayers in laminated articles, which may comprise paper, wood, woven textiles, felt, glass, metal and the like, an outstanding example being a structure consisting of layers of woven glass cloth laminated and impregnated with the compounds of the invention. Some of the compounds can be dried as tough, durable, self-sustaining films.

The following examples illustrate the present invention without, however, restricting it thereto. Parts are on a basis of weight.

Example I

A mixture of 10 parts of "Indusoil" and 90 parts of diallyl phthalate were heated with stirring at about 285° C. for 153 minutes. The resulting resin was an amber-colored gel which could be infusibilized by baking.

Example II

A mixture of "Indusoil," 80 parts, and polyallyl alcohol, 20 parts, was heated for 510 minutes at about 285° C. The product was a heavy fluid having a dark color and a green fluorescence.

Example III 20 parts of "Indusoil" was reacted with 80 parts of diallyl phthalate by heating at about 285° C. with stirring for 3 hours and 40 minutes. A 75% solution of the resulting viscous liquid in methyl isobutyl ketone had a viscosity of 3.4 poises. The liquid was subjected to vacuum distillation (less than about 5 mm. of mercury pressure) to remove unreacted material and low boiling products. The resinous residue had a viscosity of A Gardner-Holt and a refractive index ($n_D^{20}$) of 1.4635. The residue was thinned with methyl isobutyl ketone. Panels were dipped into the resulting solution, removed and baked for 30 minutes. The resulting dark hard coating on the panels was resistant to scratching even at 200° C. and was resistant to immersion in 3% potassium hydroxide for 1 hour.

Example IV

A mixture of tall oil, 80 parts, and polyallyl alcohol, 20 parts, was maintained with stirring at 285° C. for 7 hours and 30 minutes. The resulting resin was of good color. A 75% solution of the resin in methyl isobutyl ketone had a viscosity of 1.40 poises. A portion of the resin was subjected to vacuum distillation at 203° C. at 0.5 mm. of mercury pressure. Steel panels were coated by dipping into 70% solutions of the undistilled resin and of the distillation residue in methyl isobutyl ketone. Coatings formed by baking at an elevated temperature for 15 minutes were hard, flexible and of excellent color. Panels baked for 25 minutes had coatings which were somewhat darker and slightly more brittle.

Example V 144 parts of "Indusoil" were reacted with 56 parts of diallyl phthalate by heating at 285° C. for 630 minutes. The resulting material had a viscosity of 280 poises. The residue from vacuum distillation of the material had a viscosity of 1.3 poises as a 75% solution in methyl isobutyl ketone.

Example VI

A mixture of "Indusoil," 10 parts, and diallyl phthalate, 90 parts, was heated with vigorous stirring for 140 minutes at 285° C., at the end of which time 72 parts of "Indusoil" were added and the reaction was continued at the stated temperatures for an additional 11 hours. The resulting resinous material was subjected to a vacuum distillation, the ingredients, volatilizing at about 203° C. at 0.5 mm. pressure, being removed. A 75% solution of the residue had a viscosity of 3.4 poises.

Example VII

Diallyl oxalate was polymerized by heating at 238° C. for 1 hour and 45 minutes. 32.5 parts of the polymer were then mixed with 166 parts of "Indusoil" and the resulting mixture was held at about 285° C. for 11 hours with stirring. The product had a viscosity of 17.6 poises. The product was subjected to vacuum distillation. The residue had a viscosity of 140 poises and a 75% solution of the residue in methyl isobutyl ketone had a viscosity of 1 poise.

We claim as our invention:

1. A process for the production of tall oil ester resins which comprises heating a polymeric carboxylic acid ester of an aliphatic unsaturated monohydric alcohol containing an olefinic linkage between the beta and gamma carbon atoms with tall oil.

2. A process for the production of tall oil ester resins which comprises heating a polymeric allyl ester of a carboxylic acid with tall oil.

3. A process for the production of tall oil ester resins which comprises heating a polydiallyl phthalate with tall oil.

4. A process for the production of tall oil ester resins which comprises heating a carboxylic acid ester of a beta, gamma unsaturated alcohol in the presence of tall oil at a temperature of from 100° C. to 300° C., whereby the ester is polymerized to the corresponding polymeric ester and the polymeric ester is reacted with the tall oil.

5. A process for the production of tall oil ester resins which comprises heating an allyl ester of a carboxylic acid at a temperature of from 250° C. to 300° C., whereby the allyl ester is polymerized to the corresponding polyallyl ester and the polyallyl ester is reacted with the tall oil.

6. A tall oil ester resin prepared by heating a polymeric allyl ester of a carboxylic acid with tall oil.

7. A tall oil ester resin prepared by heating tall oil with a polymerized ester of a carboxylic acid and an aliphatic unsaturated monohydric alcohol containing an olefinic linkage between the beta and gamma carbon atoms.

8. A tall oil ester resin prepared by heating tall oil with a polymerized ester of a polycarboxylic acid and an aliphatic unsaturated monohydric alcohol containing an olefinic linkage between the beta and gamma carbon atoms.

9. A process for the production of tall oil ester resins which comprises heating tall oil with a polymerized polyallyl ester of a polycarboxylic acid.

10. A process for the production of tall oil ester resins which comprises heating tall oil with a polymerized diallyl ester of a dicarboxylic acid.

11. A tall oil ester resin prepared by heating polydiallyl phthalate with tall oil.

FRANKLIN A. BENT.
ELBERT A. PETERSON.

REFERENCES CITED

The following references are of record in the file of this patent:

UNITED STATES PATENTS

| Number | Name | Date |
|---|---|---|
| 1,921,566 | Franzen | Aug. 8, 1933 |
| 2,228,365 | Reppe | Jan. 14, 1941 |
| 2,291,824 | Miller | Aug. 4, 1942 |
| 2,299,862 | Toussaint | Oct. 27, 1942 |
| 2,332,460 | Muskat | Oct. 19, 1943 |
| 2,332,900 | D'Alelio | Oct. 26, 1943 |
| 2,376,504 | Pfann | May 22, 1945 |

OTHER REFERENCES

Blicke, Jour. Amer. Chem. Soc., vol. 45 (pp. 1562–1566) (1923).